United States Patent
Kim

(10) Patent No.: US 9,564,614 B2
(45) Date of Patent: Feb. 7, 2017

(54) SECONDARY BATTERY

(71) Applicant: SAMSUNG SDI CO., LTD., Yongin, Gyeonggi-Do (KR)

(72) Inventor: Jae-Hyung Kim, Yongin (KR)

(73) Assignee: Samsung SDI Co., Ltd., Yongin-si (KR)

( * ) Notice: Subject to any disclaimer, the term of this patent is extended or adjusted under 35 U.S.C. 154(b) by 510 days.

(21) Appl. No.: 13/677,082

(22) Filed: Nov. 14, 2012

(65) Prior Publication Data

US 2013/0202952 A1   Aug. 8, 2013

(30) Foreign Application Priority Data

Feb. 3, 2012   (KR) ........................ 10-2012-0011169

(51) Int. Cl.
| | |
|---|---|
| *H01M 2/02* | (2006.01) |
| *H01M 2/06* | (2006.01) |
| *B32B 27/08* | (2006.01) |
| *B32B 27/32* | (2006.01) |

(52) U.S. Cl.
CPC ............ *H01M 2/0202* (2013.01); *B32B 27/08* (2013.01); *B32B 27/32* (2013.01); *H01M 2/0287* (2013.01); *H01M 2/06* (2013.01); *B32B 2457/10* (2013.01)

(58) Field of Classification Search
CPC .... H01M 2/0287; H01M 2/0202; H01M 2/06; B32B 27/08; B32B 27/32; B32B 2457/10
See application file for complete search history.

(56) References Cited

U.S. PATENT DOCUMENTS

| 6,387,566 B1* | 5/2002 | Chang | H01M 2/0212 29/623.1 |
|---|---|---|---|
| 2006/0263681 A1* | 11/2006 | Lee | 429/176 |
| 2008/0241654 A1* | 10/2008 | Koh et al. | 429/100 |
| 2009/0081537 A1* | 3/2009 | Kim | H01M 2/1022 429/176 |
| 2011/0250485 A1* | 10/2011 | Tsukuda | H01M 2/021 429/153 |
| 2011/0287308 A1* | 11/2011 | Kim et al. | 429/176 |
| 2012/0251863 A1* | 10/2012 | Berger et al. | 429/99 |

FOREIGN PATENT DOCUMENTS

| KR | 10-2006-0087185 A | 8/2006 |
|---|---|---|
| KR | 10-2008-0019311 A | 3/2008 |
| KR | 10-2009-0029146 A | 3/2009 |

* cited by examiner

*Primary Examiner* — Ula C Ruddock
*Assistant Examiner* — Lisa S Park
(74) *Attorney, Agent, or Firm* — Lewis Roca Rothgerber Christie LLP

(57) ABSTRACT

A secondary battery including: an electrode assembly; a case receiving the electrode assembly and including a plurality of stepped sections at an inner side of the case in contact with the electrode assembly; and at least one electrode tab electrically connected with the electrode assembly and withdrawn toward an outside of the case. In the secondary battery, a friction force between the inner side of the case and the electrode assembly is increased due to the plurality of stepped sections, thereby minimizing or reducing movement of the electrode assembly within the case.

13 Claims, 5 Drawing Sheets

SECONDARY BATTERY

CROSS-REFERENCE TO RELATED APPLICATION

This application claims priority to and the benefit of Korean Patent Application No. 10-2012-0011169, filed on Feb. 3, 2012 in the Korean Intellectual Property Office, the entire content of which is incorporated herein by reference.

BACKGROUND

1. Field

Aspects of embodiments of the present invention relate to a secondary battery.

2. Description of the Related Art

A secondary battery has a function of charging and discharging. Recently, secondary batteries have been widely used as an energy source in devices such as a smartphone, a notebook computer, and an electric tool, for example.

Generally, the secondary battery consists of an electrode assembly and a case for receiving the electrode assembly. The electrode assembly consists of an anode plate having a surface of an anode collector coated with an anode active material, a cathode plate having a surface of a cathode collector coated with a cathode active material, and a separator disposed between the anode plate and the cathode plate to electrically isolate the anode plate and the cathode plate, wherein the anode plate, the cathode plate, and the separator may be wound in a jelly roll shape. In addition, the case receives the electrode assembly and covers the electrode assembly.

In this case, two electrode tabs are exposed to the outside of the case and have one-to-one correspondence with the anode plate and the cathode plate to electrically connect each other.

When the electrode assembly moves within the case, a deviation of a length of the electrode tabs exposed to the outside may become large and decrease the production yield of the secondary battery.

SUMMARY

According to an aspect of embodiments of the present invention, an electrode assembly and a secondary battery including a case receiving the electrode assembly are capable of improving a production yield by minimizing or reducing a movement of the electrode assembly within the case in the secondary battery.

According to one embodiment of the present invention, a secondary battery includes: an electrode assembly; a case receiving the electrode assembly and including a plurality of stepped sections at an inner side of the case in contact with the electrode assembly; and at least one electrode tab electrically connected with the electrode assembly and withdrawn toward an outside of the case.

The case may include at least two stacked layers. In one embodiment, the at least two stacked layers include: a first layer at the inner side of the case, the first layer contacting the electrode assembly in a receiving space of the case and including the stepped sections; and a second layer stacked with the first layer. The second layer may have a hardness greater than a hardness of the first layer. The first layer may include cast polypropylene (CPP).

The case may further include a third layer stacked with the second layer. The second layer may include a metal, and the third layer may include an insulating material.

In one embodiment, the plurality of stepped sections includes a plurality of holes formed in the first layer. The second layer may be exposed through the holes.

The plurality of stepped sections may include a plurality of grooves formed in the first layer and having a depth less than a thickness of the first layer.

The plurality of stepped sections may include a plurality of protrusions protruding from the first layer.

In one embodiment, the case includes a receiving section receiving the electrode assembly, and a cover section covering the electrode assembly, the receiving section includes a bottom section, a side wall section extending from the bottom section, and a junction section extending from an upper end section of the side wall section, and the junction section and the cover section are coupled to each other.

In one embodiment, the plurality of stepped sections are arranged on substantially the entire bottom section. In one embodiment, the plurality of stepped sections are arranged along a periphery of the bottom section. In one embodiment, the plurality of stepped sections are arranged on opposite end sections of the bottom section.

The case may be a pouch-type case.

According to an aspect of embodiments of the present invention, a plurality of stepped portions for increasing a friction force between the electrode assembly and the case is formed at a bottom portion of the case in contact with the electrode assembly, wherein movement of the electrode assembly within the case may be minimized or reduced by the stepped portion.

According to another aspect of embodiments of the present invention, a secondary battery is configured to maintain a length of electrode tabs withdrawn outside of a case constant or substantially constant, thereby improving a production yield of the secondary battery.

BRIEF DESCRIPTION OF THE DRAWINGS

The accompanying drawings, together with the specification, illustrate some exemplary embodiments of the present invention, and, together with the description, serve to explain principles and aspects of the present invention.

DETAILED DESCRIPTION

Figure 1:
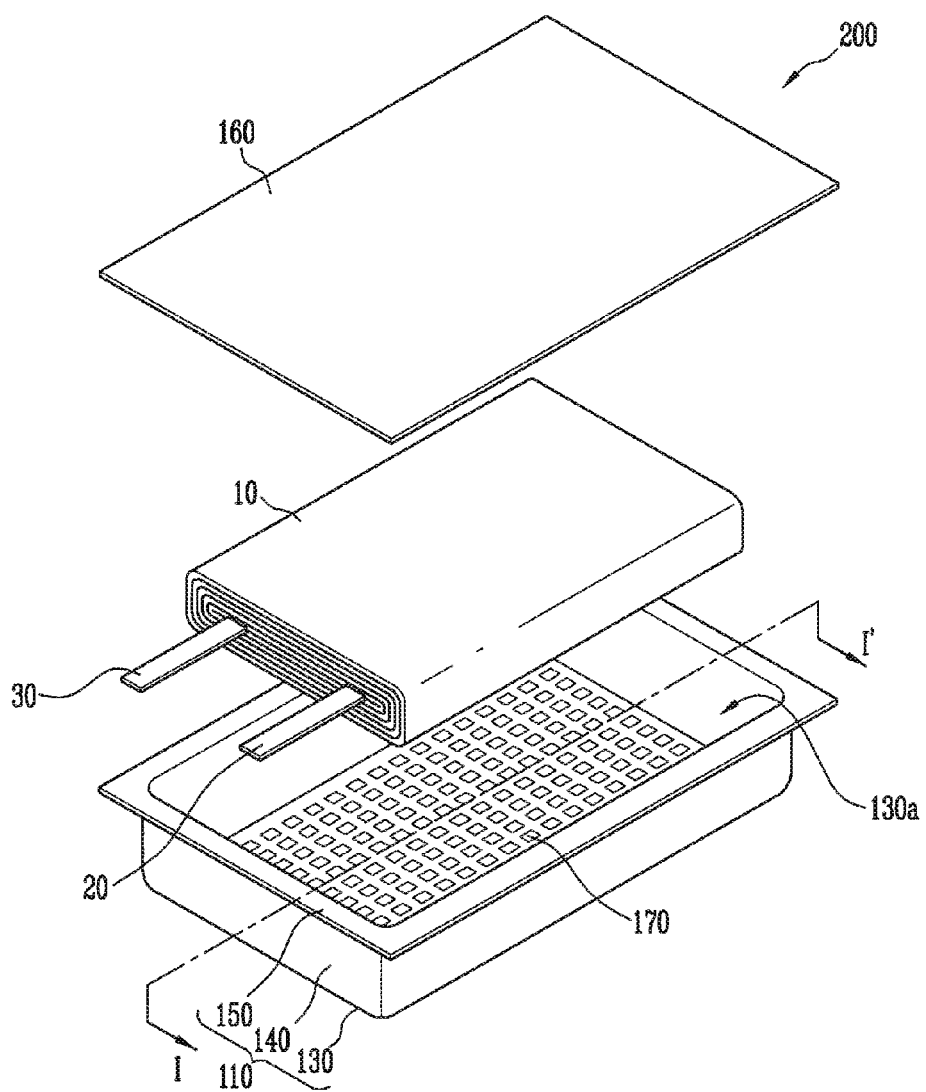
FIG. 1 is an exploded perspective view of a secondary battery according to an embodiment of the present invention.

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or indirectly on the another element with one or more intervening elements interposed therebetween. Also, when an element is referred to as being "connected to" another element, it can be directly connected to the another element or indirectly connected to the another element with one or more intervening elements connected therebetween. Like reference numerals are used herein to refer to like elements.

Configurations and operations of some exemplary embodiments of the present invention are described herein with reference to the accompanying drawings.

Figure 2:
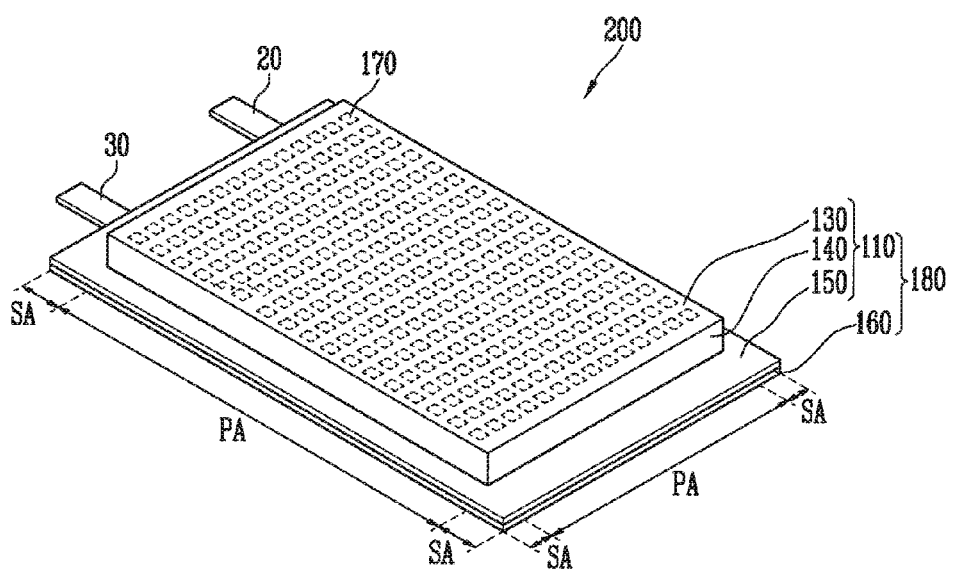
FIG. 2 is a bottom perspective view of the secondary battery shown in FIG. 1.

FIG. 1 is an exploded perspective view of a secondary battery according to an embodiment of the present invention; FIG. 2 is a bottom perspective view of the secondary battery shown in FIG. 1; and FIG. 3 is a cross-sectional view of the secondary battery of FIG. 1, taken along the line of FIG. 1.

Figure 3:
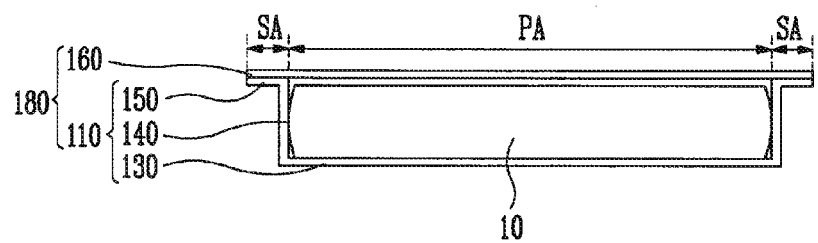
FIG. 3 is a cross-sectional view of the secondary battery of FIG. 1, taken along the line I-I'.

Referring to FIGS. 1 through 3, a secondary battery 200 includes an electrode assembly 10 and a case 180 covering, or receiving, the electrode assembly 10.

In one embodiment, the electrode assembly 10 includes an anode plate having a surface of an anode collector coated with an anode active material, a cathode plate having a surface of a cathode collector coated with a cathode active material, and a separator disposed between the anode plate and the cathode plate to electrically isolate the anode plate and the cathode plate. In one embodiment, the anode plate, the cathode plate, and the separator are wound in a jelly roll shape.

Although not shown in detail in the drawings, a first electrode tab 20 is electrically connected to the anode plate to be withdrawn toward the outside of the case 180, and a second electrode tab 30 is electrically connected to the cathode plate to be withdrawn toward the outside of the case 180. In the secondary battery 200 according to one embodiment, the first electrode tab 20 and the second electrode tab 30 may be electrically connected to a power terminal of an electrical apparatus, and the secondary battery 200 provides power to the external electrical apparatus.

In one embodiment, the separator of the electrode assembly is porous and may be made of a film, a non-woven fabric, or the like, and may be made of polyethylene, polypropylene, polyvinylidene fluoride, for example, and interposed between the anode plate and the cathode plate to pass ions between the anode plate and the cathode plate while preventing or substantially preventing direct contact between the anode plate and the cathode plate.

The case 180, in one embodiment, includes a receiving section 110 and a cover section 160 having a junction area SA and a receiving area PA.

The receiving section 110, in one embodiment, includes a bottom section 130, a side wall section 140 extending from the bottom section 130, and a junction section 150 bent from an upper end section of the side wall section 140 to be approximately parallel with the bottom section 130. In one embodiment of the present invention, the junction section 150 may be formed in a shape surrounding the bottom section 130 having a generally rectangular shape.

In a construction of the case 180, the electrode assembly 10 is received within a receiving space 130a in the receiving area PA, and the cover section 160 is joined to the junction section 150 in the junction area SA. Therefore, the electrode assembly 10 is covered or contained from the outside of the case 180.

According to an embodiment of the present invention, the case 180 is made of a plurality of stacked layers or films different from each other, and a plurality of holes 170 having a stepped shape may be formed in an uppermost layer of the films in contact, or adjacent, with the receiving space 130a in the plurality of films corresponding to the bottom section 130.

The plurality of holes 170 increases a friction force between the electrode assembly 10 and the bottom section 130 and, accordingly, the friction force of the plurality of the holes 170 minimizes or reduces movement of the electrode assembly 10 within the receiving section 110. Therefore, this prevents or substantially prevents the first and second electrode tabs 20 and 30 from increasing a deviation of length withdrawn toward the outside of the case 180 according to the movement of the electrode assembly 10.

The plurality of films stacked with each other of the case 180 and a structure of the plurality of holes 170 are described in further detail below.

Figure 4A:
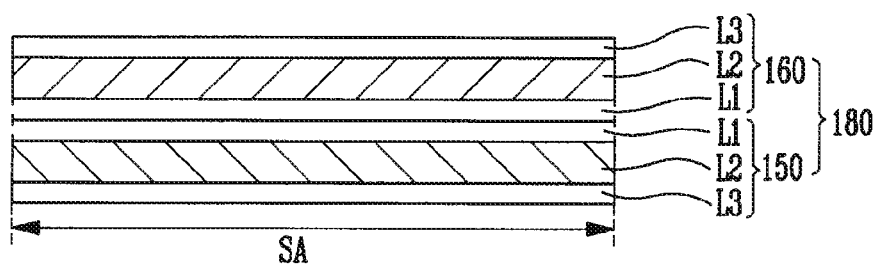
FIG. 4A is an enlarged cross-sectional view of a portion of a secondary battery corresponding to a junction area shown in FIG. 3.
Figure 4B:
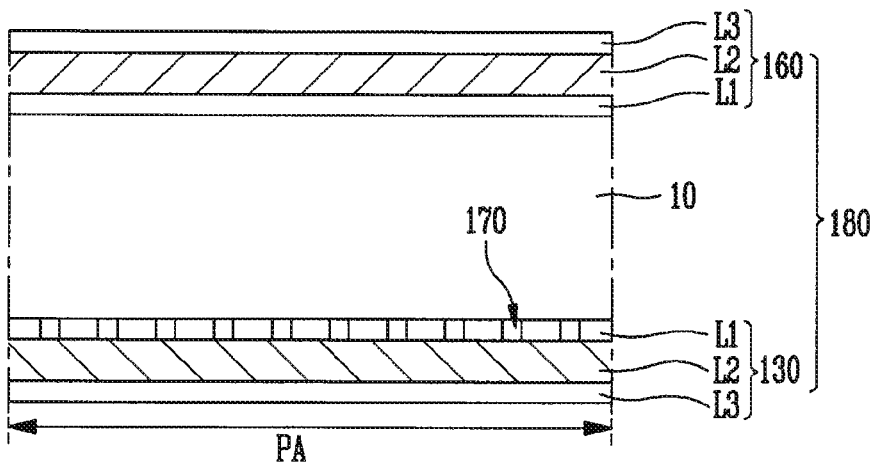
FIG. 4B is an enlarged cross-sectional view of a portion of a secondary battery corresponding to a receiving area shown in FIG. 3.

FIG. 4A is an enlarged cross-sectional view of a portion of the secondary battery 200 corresponding to the junction area SA shown in FIG. 3. FIG. 4B is an enlarged cross-sectional view of a portion of the secondary battery 200 corresponding to the receiving area PA shown in FIG. 3.

Referring to FIG. 4A, in one embodiment, in construction of the case 180 corresponding to the junction area SA, each of the junction section 150 and the cover section 160 includes a first layer L1, a second layer L2, and a third layer L3.

In one embodiment, in each of the junction section 150 and the cover section 160, the first layer L1 and the third layer L3 are disposed on opposite outermost sides, and the second layer L2 is stacked between the first layer L1 and the third layer L3.

According to one embodiment, in a construction of the case 180, the first layer L1 of the junction section 150 and the first layer L1 of the cover section 160 may be joined by a joining process using heat and pressure.

In one embodiment, the first layer L1 may be made of cast polypropylene (CPP), and a junction between the junction section 150 and the cover section 160 may be easily made using the joining process.

The second layer L2 of the case 180, in one embodiment, functions to reinforce a strength of the case 180. Therefore, in one embodiment of the present invention, the second layer L2 is made of a metal (e.g., aluminum) having a hardness greater than that of the first layer L1, and the second layer L2 may be formed having a thickness greater than that of the first layer L1 and the third layer L3.

The third layer L3 of the case 180 covers the second layer L2 in order to prevent or substantially prevent the second layer L2 from being exposed to the outside. In one embodiment, when the second layer L2 is made of a metal, the third layer L3 may be made of a resin, such as nylon, polypropylene, or polyethylene, for example.

In one embodiment of the present invention, the third layer L3 may be formed as single layer, but in other embodiments of the present invention, the third layer L3 may be formed as a plurality of stacked layers having a different insulating material.

Referring to FIGS. 2 and 4B, in one embodiment, in a construction of the case 180 corresponding to the receiving area SA, each of the bottom section 130 and the cover section 160 includes the first layer L1, the second layer L2, and the third layer L3.

The first layer L1 of the bottom section 130 is formed with a plurality of stepped portions and, in one embodiment of the present invention, as shown in FIG. 4B, the plurality of stepped sections is implemented as the plurality of holes 170. In one embodiment, the plurality of holes 170 is formed over the entire bottom section 130. Each of the plurality of holes 170, in one embodiment, is formed by partially removing the first layer L1 by a thickness (e.g., a predetermined thickness) of the layer. In one embodiment, the second layer L2 is exposed through the plurality of holes 170.

By contrast, in a secondary battery in which a plurality of holes is not formed on a bottom section, a surface of the bottom section is flat, an electrode assembly disposed on the bottom section moves within the bottom section, and a deviation of a length of first and second electrode tabs withdrawn toward the outside can increase. However, according to embodiments of the present invention, the bottom section 130 has a stepped section in a position of the plurality of holes 170 to increase a friction force between the bottom section 130 and the electrode assembly 10, such that movement of the electrode assembly 10 on the bottom section 130 is minimized or reduced. Therefore, the deviation of the length of the first and second electrode tabs 20 and 30 exposed to the outside is minimized or reduced to improve a production yield.

Figure 5:
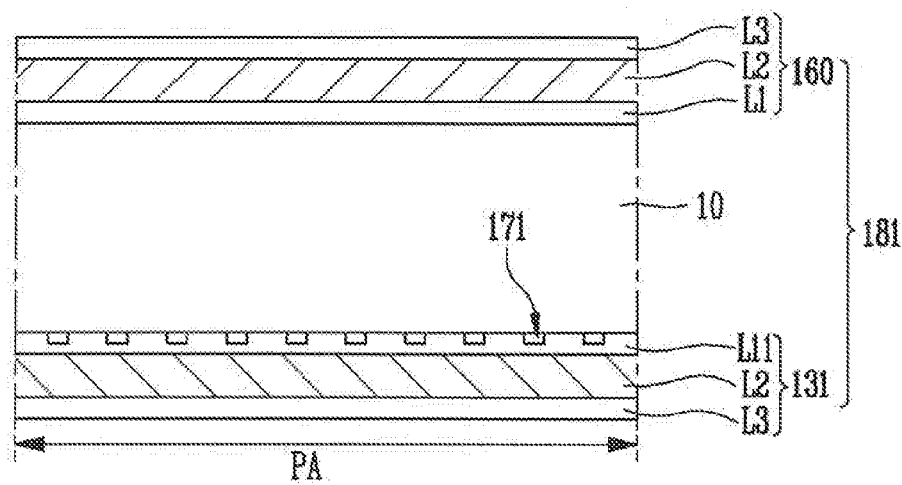
FIG. 5 is a cross-sectional view of a secondary battery according to another embodiment of the present invention.

FIG. 5 is a cross-sectional view of a secondary battery according to another embodiment of the present invention. A location of the cross-section of the secondary battery shown in FIG. 5 corresponds to that of the cross-section of the secondary battery 200 shown in FIG. 4B.

Comparing the secondary battery 200 described above and shown in FIG. 4B with a secondary battery 201 according to another embodiment of the present invention, as shown in FIG. 5, it is noted that the construction in the bottom section 130 of the secondary battery 200 and a bottom section 131 of a case 181 of the secondary battery 201 is different and that the other components and features are the same. Therefore, further description of the components and features of the secondary battery 201 that are the same as those described above with respect to the secondary battery 200 will not be repeated.

The bottom section 131 of the case 181, in one embodiment, includes a first layer L11, the second layer L2, and the third layer L3 that are stacked (e.g., sequentially stacked), and the first layer L11 is formed with a plurality of stepped sections. In one embodiment, as shown in FIG. 5, the plurality of stepped sections is formed as a plurality of grooves 171. The grooves 171, in one embodiment, are formed to have a depth less than a thickness of the first layer L11. The plurality of grooves 171, in one embodiment, may be formed over the entire bottom section 131.

Like the effect produced by the plurality of holes 170 in the secondary battery 200 described above with respect to FIG. 4B, the bottom section 131 has a stepped shape in the plurality of grooves 171 to increase a friction force between the bottom section 131 and the electrode assembly 10, such that movement of the electrode assembly 10 on the bottom section 131 is minimized or reduced.

Figure 6:
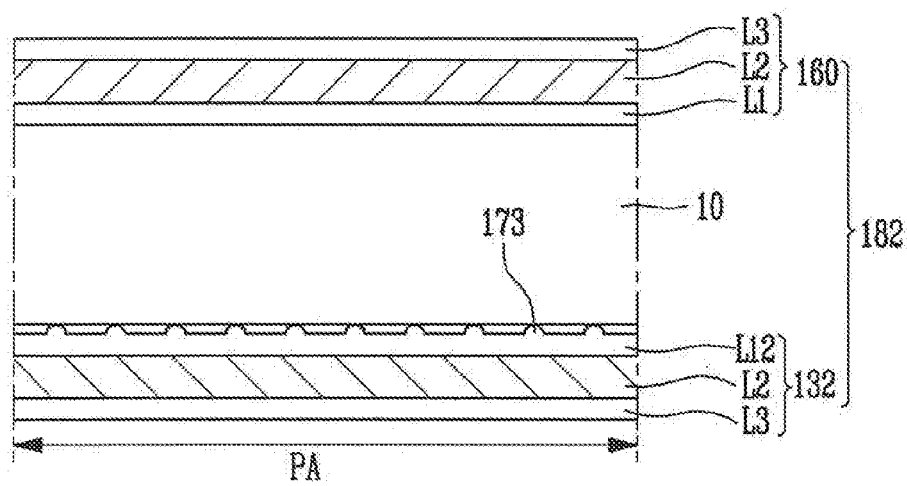
FIG. 6 is a cross-sectional view of a secondary battery according to another embodiment of the present invention.

FIG. 6 is a cross-sectional view of a secondary battery according to another embodiment of the present invention. A location of the cross-section of the secondary battery shown in FIG. 6 corresponds to that of the cross-section of the secondary battery 200 shown in FIG. 4B.

Comparing the secondary battery 200 described above and shown in FIG. 4B with a secondary battery 202 according to another embodiment of the present invention, as shown in FIG. 6, it is noted that the construction in the bottom section 130 of the secondary battery 200 and a bottom section 132 of a case 182 of the secondary battery 202 is different and that the other components and features are the same. Therefore, further description of the components and features of the secondary battery 202 that are the same as those described above with respect to the secondary battery 200 will not be repeated.

The bottom section 132 of the case 182, in one embodiment, includes a first layer L12, the second layer L2, and the third layer L3 that are stacked (e.g., sequentially stacked), and the first layer L12 is formed with a plurality of stepped sections. In one embodiment, as shown in FIG. 6, the plurality of stepped sections is formed as a plurality of protrusions 173 protruding from the first layer L12. The plurality of protrusions 173, in one embodiment, may be formed over the entire bottom section 132.

Like the effect produced by the plurality of holes 170 in the secondary battery 200 described above with respect to FIG. 4B, the bottom section 132 has a stepped shape in the plurality of protrusions 173 to increase a friction force between the bottom section 132 and the electrode assembly 10, such that movement of the electrode assembly 10 on the bottom section 132 is minimized or reduced.

Figure 7:
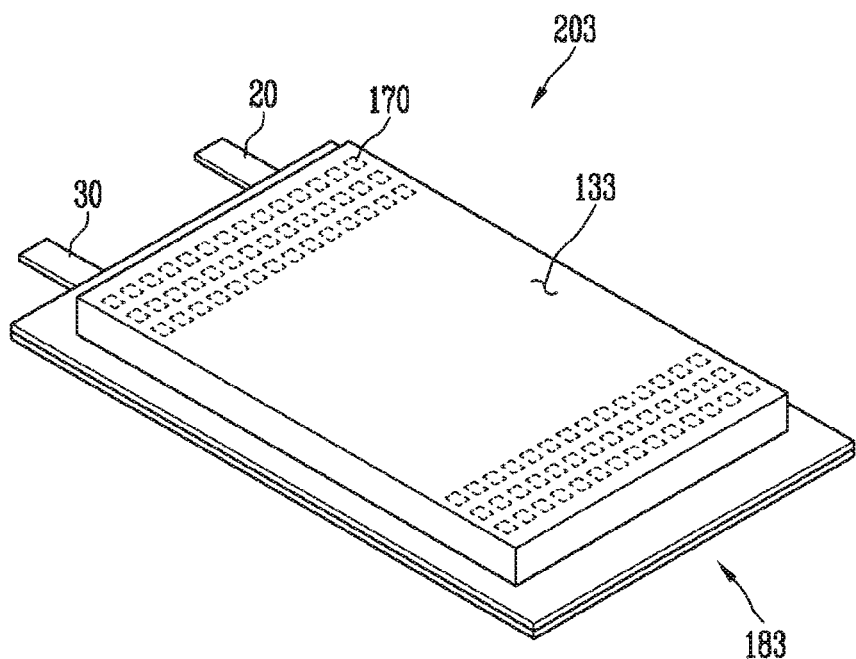
FIG. 7 is a bottom perspective view of a secondary battery according to another embodiment of the present invention.

FIG. 7 is a bottom perspective view of a secondary battery according to another embodiment of the present invention. Comparing the secondary battery 200 described above and shown in FIG. 2 with a secondary battery 203 according to another embodiment of the present invention, as shown in FIG. 7, it is noted that a position of a plurality of holes 170 in a bottom section 133 of a case 183 of the secondary battery 203 is different than that of the secondary battery 200 and that the other components and features are the same.

Therefore, further description of the components and features of the secondary battery 203 that are the same as those described above with respect to the secondary battery 200 will not be repeated.

Referring to FIG. 7, in one embodiment, the bottom section 133 of the case 183 is formed with the plurality of holes 170, and the plurality of holes 170 is formed at both of opposite end sections of the bottom section 133. Therefore, the friction force between both end sections of the bottom section 133 and the electrode assembly 10 placed on both end sections is increased by the plurality of holes 170, and movement of the electrode assembly 10 on the bottom section 133 is minimized or reduced in a similar effect as described above with reference to FIGS. 1 through 4B.

In the secondary battery 203 according to one embodiment, as shown in FIG. 7, the plurality of holes 170 is formed on the bottom section 133. However, in another embodiment, the plurality of grooves 171 described above with reference to FIG. 5 or the plurality of protrusions 173 described above with reference to FIG. 6 may be formed on the bottom section 133 instead of or in combination with the holes 170.

Figure 8:
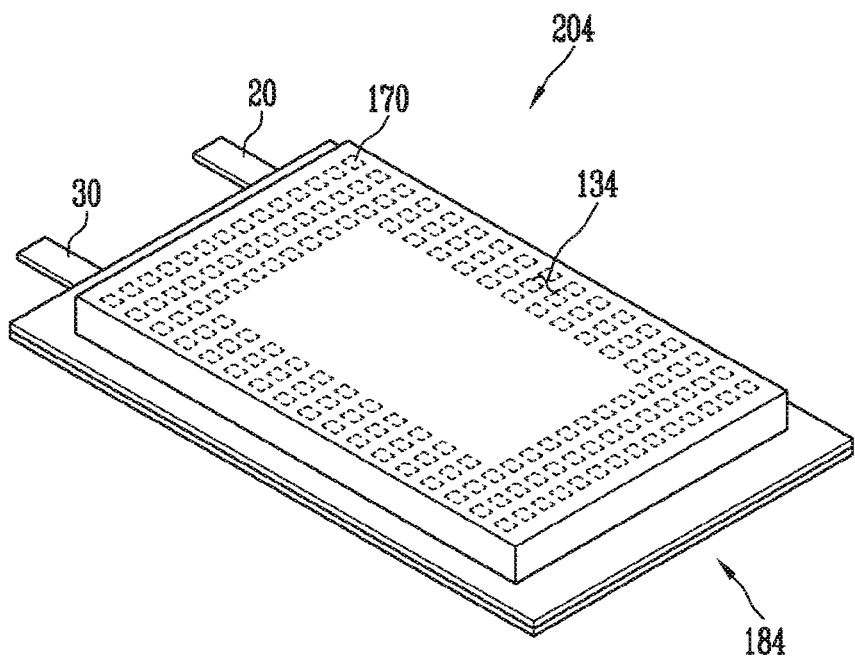
FIG. 8 is a bottom perspective view of a secondary battery according to another embodiment of the present invention.

FIG. 8 is a bottom perspective view of a secondary battery according to another embodiment of the present invention. Comparing the secondary battery 200 described above and shown in FIG. 2 with a secondary battery 204 according to another embodiment of the present invention, as shown in FIG. 8, it is noted that a position of a plurality of holes 170 in a bottom section 134 of a case 184 of the secondary battery 204 is different than that of the secondary battery 200 and that the other components and features are the same.

Therefore, further description of the components and features of the secondary battery 204 that are the same as those described above with respect to the secondary battery 200 will not be repeated.

Referring to FIG. 8, in one embodiment, the bottom section 134 of the case 184 is formed with the plurality of holes 170, and the plurality of holes 170 is formed along a border section, or periphery section, surrounding a center section of the bottom section 134. Therefore, the friction force between the border section of the bottom section 134 and the electrode assembly 10 placed on the border section is increased by the plurality of holes 170, and movement of the electrode assembly 10 on the bottom section 134 is minimized or reduced in a similar effect as described above with reference to FIGS. 1 through 4B.

In the secondary battery 204 according to one embodiment, as shown in FIG. 8, the plurality of holes 170 is formed on the bottom section 134. However, in another embodiment, the plurality of grooves 171 described above with reference to FIG. 5 or the plurality of protrusions 173 described above with reference to FIG. 6 may be formed on the bottom section 134 instead of or in combination with the holes 170.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims.

What is claimed is:

1. A secondary battery comprising:
an electrode assembly;
a case receiving the electrode assembly and including a plurality of stepped sections at an inner side of the case in contact with the electrode assembly; and
at least one electrode tab electrically connected with the electrode assembly and withdrawn toward an outside of the case in a first direction,
wherein the case includes a receiving section receiving the electrode assembly, and a cover section covering the electrode assembly,
wherein the receiving section includes a bottom section, a side wall section extending from the bottom section, and a junction section extending from upper end section of the side wall section,
wherein the junction section and the cover section are coupled to each other,
wherein the electrode assembly comprises a pair of first sides extending in the first direction, being spaced apart in a second direction, and facing the bottom section and the cover section, respectively, and a pair of second sides extending in the first direction and facing opposite sides of the side wall section, respectively, the first sides being larger than the second sides,
wherein the bottom section comprises at least a first layer contacting the electrode assembly, and stepped sections of the plurality of stepped sections are at a surface of the first layer facing the cover section and being in direct contact with a first side of the pair of first sides of the electrode assembly, and
wherein the stepped sections are defined by a plurality of openings in the first layer such that a thickness in the second direction of the first layer at a stepped section of the stepped sections is less than a thickness in the second direction of the first layer at a region of the bottom section adjacent the stepped section.

2. The secondary battery of claim 1, wherein the case comprises at least stacked layers including the first layer.

3. The secondary batten of claim 2, wherein the at least two stacked layers comprise:
the first layer at the inner side of the case, the first layer contacting the electrode assembly in a receiving space of the case and including the stepped sections; and
a second layer stacked with the first layer.

4. The secondary battery of claim 3, wherein the second layer has a hardness greater than a hardness of the first layer.

5. The secondary battery of claim 3, wherein the first layer comprises cast polypropylene (CPP).

6. The secondary battery of claim 3, wherein the case further comprises a third layer stacked with the second layer.

7. The secondary battery of claim 6, wherein the second layer comprises a metal, and the third layer comprises an insulating material.

8. The secondary battery of claim 3, wherein the plurality of openings includes a plurality of holes formed in the first layer, and wherein the second layer is exposed through the holes.

9. The secondary battery of claim 3, wherein the plurality of openings includes a plurality of grooves formed in the first layer and each having a depth in the second direction less than a thickness of the first layer at a region adjacent the respective groove.

10. The secondary battery of claim 1, wherein the plurality of stepped sections are arranged on substantially the entire bottom section.

11. The secondary battery of claim 1, wherein the plurality of stepped sections are arranged along a periphery of the bottom section.

12. The secondary battery of claim 1, wherein the plurality of stepped sections are arranged on opposite end sections of the bottom section.

13. The secondary battery of claim 1, wherein the case is a pouch-type case.

* * * * *